Figure 1:
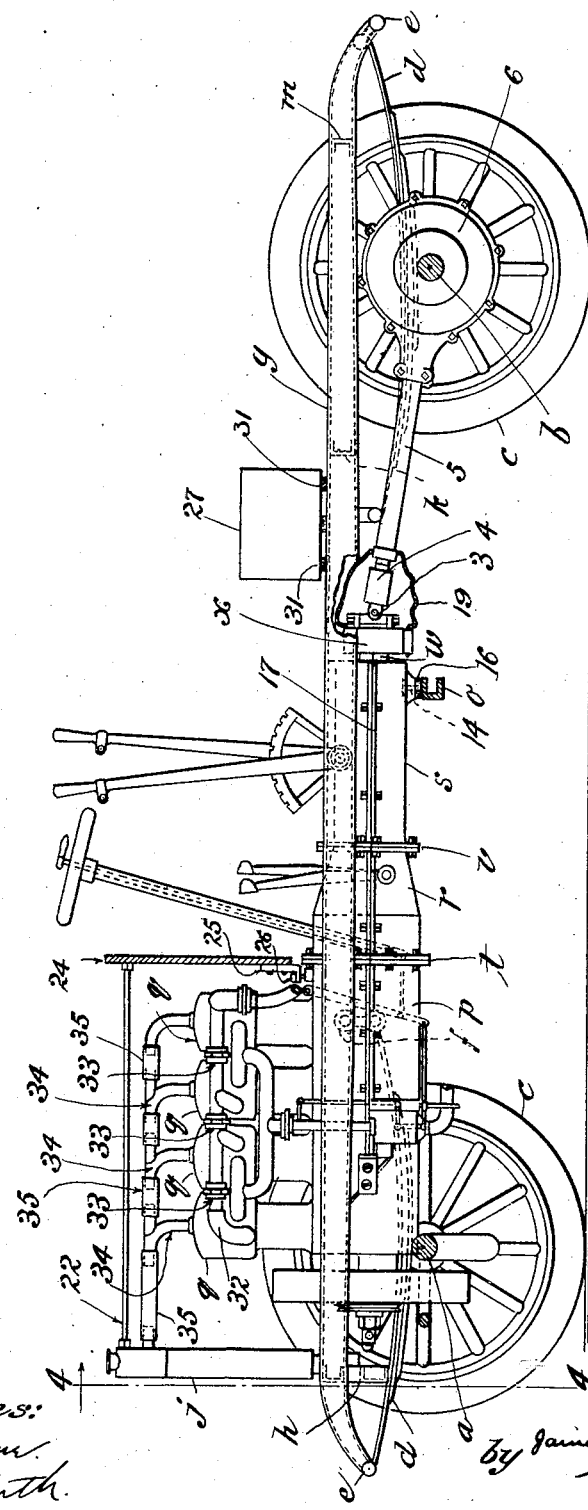

No. 786,349. PATENTED APR. 4, 1905.
J. F. DURYEA.
MOTOR VEHICLE.
APPLICATION FILED DEC. 12, 1904.

3 SHEETS—SHEET 2.

No. 786,349. PATENTED APR. 4, 1905.
J. F. DURYEA.
MOTOR VEHICLE.
APPLICATION FILED DEC. 12, 1904.

3 SHEETS—SHEET 3.

Witnesses:
H. L. Sprague
E. L. Smith

Inventor:
James F. Duryea
by Chapin & Co.
Attorneys.

No. 786,349.

Patented April 4, 1905.

UNITED STATES PATENT OFFICE.

JAMES FRANK DURYEA, OF SPRINGFIELD, MASSACHUSETTS.

MOTOR-VEHICLE.

SPECIFICATION forming part of Letters Patent No. 786,349, dated April 4, 1905.

Application filed December 12, 1904. Serial No. 236,504.

*To all whom it may concern:*

Be it known that I, JAMES FRANK DURYEA, a citizen of the United States of America, residing at Springfield, in the county of Hampden and State of Massachusetts, have invented new and useful Improvements in Motor-Vehicles, of which the following is a specification.

This invention relates to the construction of automobile vehicles, and it has special reference to that type in which the motor is located at the forward end of the frame, with the crank-shaft running lengthwise of the latter and having a driving connection with the rear axle, consisting of beveled gears, a universal joint being interposed at some convenient point in the line of connection between the rear axle and the crank-shaft to provide the requisite flexibility between the motor and the driving-axle. In the construction of automobile vehicles of this type certain conditions always exist which render certain features in the construction indispensable to the proper operation of the machine. First, the running-gear must be sufficiently flexible to adapt itself to the usual inequalities of the road; second, the motor-platform (as the frame of the vehicle may be designated) cannot be constructed so as to provide an absolutely rigid base for the motor; third, when the motor is located so that the crank-shaft extends longitudinally of the vehicle and a "direct drive," as it is called, for the driving-axle is provided it becomes necessary to locate the motor, the variable-speed-transmission devices, clutch, and tail-shaft all in a line. Therefore these various conditions, which are practically inevitable, necessitate the construction of the moving parts on a solid base, which is suitably hung in the frame, or at least on such base must be the motor, the variable-speed-transmission device, and the clutch interposed between the latter and said transmission device, and this invention resides particularly in the construction of the frame of the automobile and its running-gear and the disposition thereon of the motor, the transmission device, and clutch, all mounted on a rigid base and supported on the frame in such manner that the latter may move as it must move in adapting itself to the constantly-varying road conditions without subjecting said motor-base to undue strain.

The invention further resides in the adaptation of the same principles of construction as are found in the disposition of the motor to other parts supported on the frame and subject to the same torsional or working strains to which the motor-base is subject; and, further, the invention resides in the construction of the motor-base and in the disposition of the parts contained therein in such manner as to facilitate the building of the same and to render the parts contained in the base readily accessible for inspection, adjustment, or repairs.

Still another object of the invention is to provide a location on the engine-base for certain of the controlling devices, thus permitting direct connection with the controlling mechanism in the motor-base and eliminating flexible connections between these controlling devices and the frame.

The invention is clearly illustrated in the drawings accompanying this application, in which—

Figure 2:
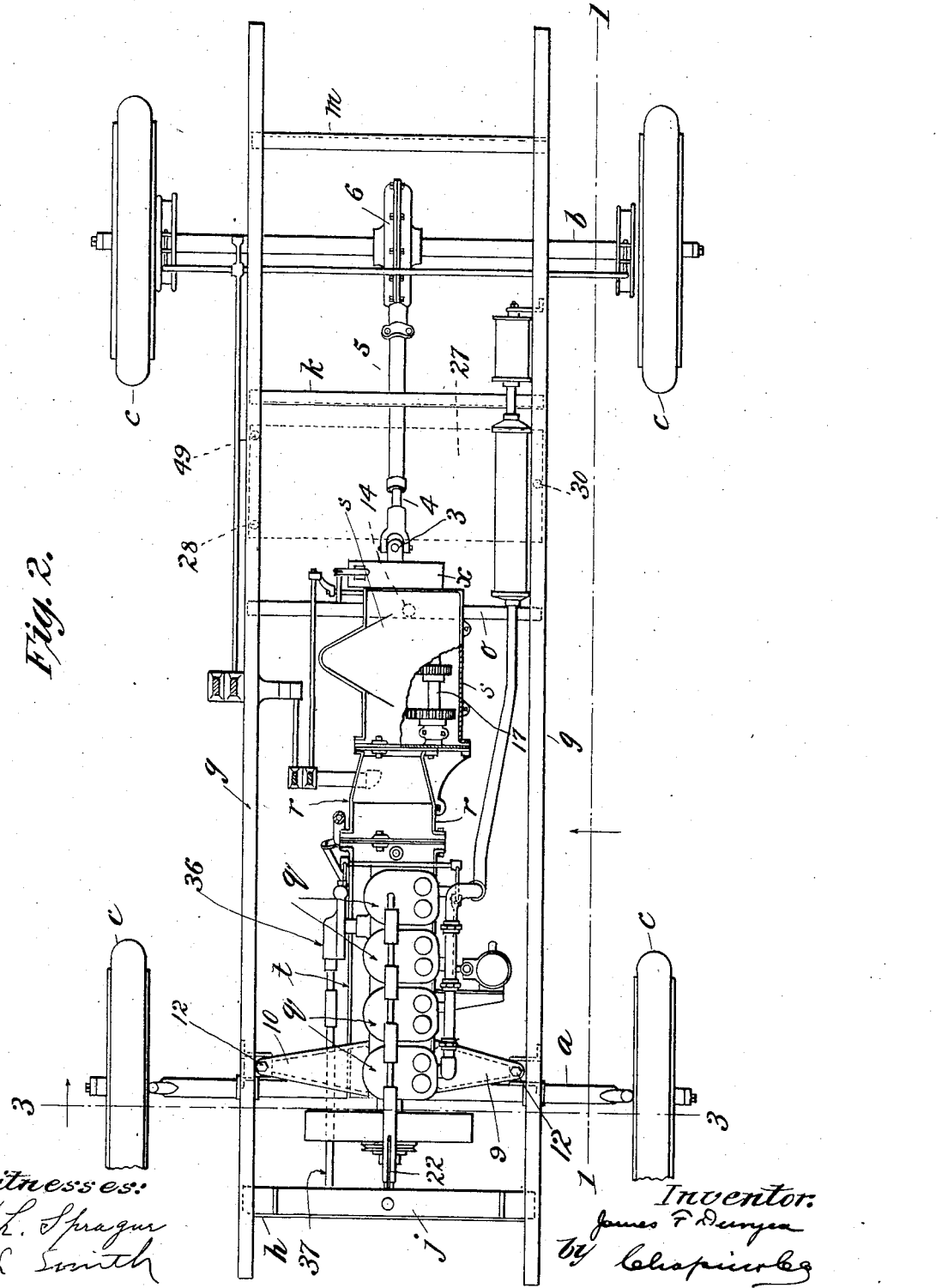
Figure 3:
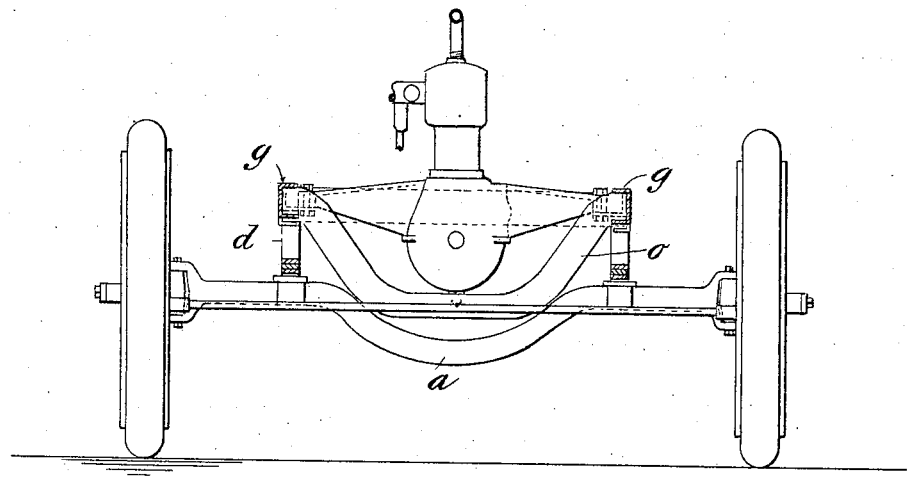
Figure 4:
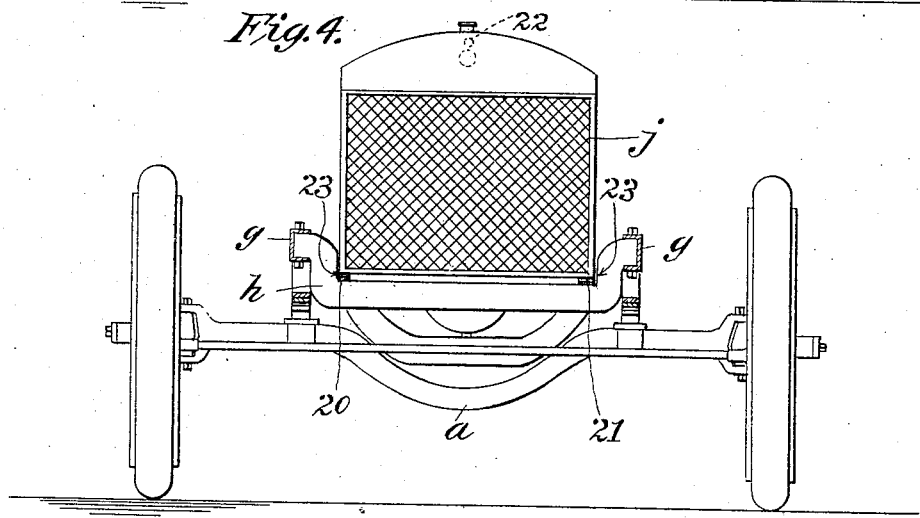
Figure 5:
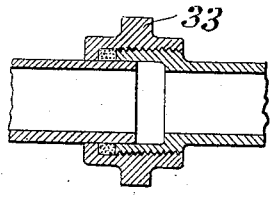

Figure 1 is a sectional elevation of an automobile construction in which the invention has been embodied, the plane of this section being on line 1 1, Fig. 2, certain parts of the construction being broken away. Fig. 2 is a plan view of the vehicle construction, certain parts having been removed and certain parts being broken away. Fig. 3 is a sectional elevation of the construction, taken on line 3 3, Fig. 2, looking in the direction of the arrow on said line. Fig. 4 is a front elevation of the vehicle. Fig. 5 is a detailed view of an expansion-joint in the exhaust-pipe of the engine.

Referring now to the drawings, *a* and *b* indicate, respectively, the front and rear axles of the vehicle, provided with wheels *c*. These axles are supported on semi-elliptical springs *d*, whose outer ends are connected, respectively, to the downturned ends of the frame, as at *e*, the inner ends thereof being connected to the side bars of the frame, as at *f*. This is ordinary construction and involves no invention.

The frame consists of the two channel-beams $g$, of steel, which constitute the side bars of the frame, which preferably are turned downwardly at their ends, as shown in Fig. 1, and tapered to give them a finished appearance and to properly distribute the weight of the metal therein. These side bars are tied together at the forward end by the cross-bar $h$, which dips downwardly, as shown in Fig. 4, and on which is mounted the cooling device $j$. Other cross-braces $k$ and $m$ are located, respectively, in front of and at the rear of the rear axle $b$ and extend straight across the frame, and a fourth brace $o$ is located about midway between the axles and also curves downwardly, as shown in Fig. 3. This last-named brace constitutes the only support of the rear end of the motor-base, which is made up of three parts—viz., the part $p$, which is directly under the engine-cylinders $q$ and to which the latter are secured or of which they form a part, and portions $r$ and $s$, which are secured one to the other and to the base portion $p$ by bolts, the contiguous ends of these parts being flanged and their joining lines being indicated by $t$ and $v$. The motor-base made up of these three separable portions $p$, $r$, and $s$ are tubular in cross-section, and in this base are inclosed the crank-shaft of the motor, the friction-clutch, and the variable-speed-transmission devices, reversing mechanism, &c., the clutch being inclosed within the portion $r$ of the base between the motor and the transmission device, the latter being located in the portion $s$. Both ends of this tubular base are closed, whereby grit and dust may be excluded from all of the working parts, the driving-shaft $w$ of the transmission device extending through the end of the base, as shown in Fig. 1, and having applied thereto a band-brake $x$, the end of the shaft extending beyond this brake being provided with a universal joint 3, whereby it is connected to the tail-shaft or driving-shaft 4, which extends downwardly toward the rear axle through a sleeve 5, within which it may have endwise movement, the end of this shaft 4 being provided with the usual bevel driving-gear, which is inclosed within the casing 6. The latter is of the usual construction and needs no description and is not illustrated herein, as it constitutes no part of this invention.

The tubular motor-base is divided for the greater portion of its length into two parts, the line of division being indicated by 7 and the parts being also provided with flanges whereby they are secured together by bolts.

At the forward end of the motor-base and substantially in the plane of the side bars $g$ of the frame two arms 9 and 10 extend at right angles to the forward cylinder $q$ to the sides of the frame, to which they are secured by single bolts 12, and the rear end of the motor-base rests on the downwardly-curved cross-brace $o$ in a different horizontal plane, being secured thereto by the single bolt 14, (shown in dotted lines only.) Preferably between the brace $o$ and the motor-base and under the end of the arms 9 and 10 slightly-yielding washers of rubber composition or leather, as 16, are located, as shown in Fig. 1, under the rear end of the motor-base. By thus supporting the motor-base and motor on the frame at three points, which are located at the angles of an isosceles triangle, said base cannot be subjected to the lateral or torsional strains which it is subjected to when it is secured in the usual manner by several bolts to cross-bars resting on the frame. It is obvious also by supporting the motor and its base on single bolts that far more freedom of movement of the frame relative to the motor-base is possible than where the motor is rigidly bolted to the frame.

It is of course obvious that the clutch mechanism must be located between the transmission device and the motor, and in practically all transmission devices there are two shafts lying side by side, one being the shaft which is in direct connection with the crank-shaft of the motor through the clutch and the other being, in effect, a counter-shaft through which the varying speeds may be transmitted to the tail-shaft connected to the driving-gear on the rear axle.

In constructing the motor-base it was found necessary to divide it on the lines $t$ and $v$ in order to properly machine the parts, for the reason that the form of the part $r$, which incloses the clutch, is such as to preclude the proper machining of the bearings of the counter-shaft 17 within the transmission-casing $s$ without separating the base at the points mentioned.

The band-brake $x$ is located in a suitable casing to exclude the grit and dust therefrom, and to this casing there is secured a sleeve of flexible material 19, which is secured also to the end of the sleeve 5, within which the tail-shaft is located. This flexible sleeve 19 therefore incloses the only moving parts of the mechanism which are exposed, and with this in position dust and grit are excluded from all of the moving mechanism of the motor and its connections to the driving-axle.

The motor shown herein is of the water-cooled type, $j$ being the cooling device of the well-known cellular type which is supported on the cross-bar $h$ of the frame, as shown in Fig. 4 at the points 20 and 21 thereof, at which points single screws (not shown in the drawings) extend through said cross-bar into the lower corners of the cooler, the third point of support being the bar 22, (shown in Fig. 1 particularly,) which is located at the upper end of the cooler at a point thereon which constitutes the apex of an isosceles triangle, the other two angles of which are indicated by the points of support 20 and 21. The bar 22 is more or less flexible, and at the points 20 and 21 yielding washers 23 are interposed between the corners of the cooler and the cross-brace *h*. This mode of supporting the cooler follows in principle the mode of supporting the motor-base in that each has three point bearings whereby the working movements of the frame will not to any appreciable degree subject the cooling device to any torsional strains. This is important in that these cooling devices are generally of the cellular type, and if rigidly secured in position the workings of the frame will rack them to a degree which is productive of leakage, which disadvantage, however, is overcome entirely by so fastening the cooler as to permit it to have some slight movements relative to the frame.

The bar 22, which is secured to the cooler at one end, extends rearwardly parallel with the axis of the motor, and its opposite end is secured to a vertically-disposed member 24, which constitutes a closure for one end of the hood which incloses the motor, the closure for the opposite end of this hood being the cooling device. This member 24 extends transversely of the frame and is supported thereon at each end. Directly over the axis of the crank-shaft and on this member 24 is secured a strong clip or lug 25 to receive a bolt 26, which may be screwed into the top of the motor-base, as shown in Fig. 1, whereby the latter may be supported in true alinement whenever it becomes necessary to disconnect the base at the joining lines *t* and *v* thereof. This construction permits the dismounting of the parts without disarrangement of the alinement thereof and greatly facilitates any repairs which may be necessary on the clutch or transmission device.

A fuel-tank 27 is shown in elevation in full lines in Fig. 1 and in dotted plan view in Fig. 2, mounted on the frame transversely thereof. This tank is of steel, as usual, and is also supported at three points, as shown clearly in Fig. 2. At one end there are two points of support 28 and 29 and at the other side a single point of support 30, these points being so located as to outline an isosceles triangle, whereby the tank may be supported in such manner as to permit slight movement thereof relative to the frame to relieve it from all strains due to the working movements of the frame, thereby doing away with a very common cause of leakage of the fuel-tank. Single bolts or screws are used at each of the points of support of the tank, and between the tank and the frame yielding washers are located, as indicated by 31, Fig. 1. It is not deemed necessary to show any pipe connection between the fuel-tank and the motor.

Where the motors are cast or secured to a solid base, as shown and described herein, the exhaust-pipe naturally must extend transversely of the cylinders, this exhaust-pipe being indicated by 32, and the lengthwise expansion of this pipe if made in one piece secured to or integral with the cylinders tends to throw the cylinders out of line more or less, to obviate which the pipe is made in sections which are united by expansion-joints 33, one of which is shown in Fig. 5 of the drawings in section, on an enlarged scale. The tubular connections 34 to convey the water to the cooling device are also united together by sections of flexible pipe connections 35. These are only required for the return circulation, which is of rather high temperature and which being taken out of the water-jackets of the cylinders near the upper end of the latter would by the expansion of the pipe 34, if made in one piece, tend to throw the cylinders out of alinement. This water circulation in the jackets surrounding the upper end of the cylinders is maintained in the usual manner by a pump 36, (shown in Fig. 2,) having a connection with the lower part of the cooling device by means of a pipe 37, the pump and pipe being shown only in said Fig. 2.

Having thus described my invention, what I claim, and desire to secure by Letters Patent of the United States, is—

1. The combination with the frame of a motor-vehicle, of a motor supported thereon longitudinally of the frame, said motor comprising a hollow base consisting of two or more separable sections united together, said separable sections extending beyond the motor, and means on the frame to support one portion of said base in normal alinement to permit the removal of one or more other sections of the base.

2. The combination with the frame of a motor-vehicle, of a motor extending lengthwise of the frame and supported thereon near one end thereof on or near the sides of the frame, and at the opposite end thereof at a point substantially midway of the side frames, together with a water cooling device located transversely of the vehicle and supported at three separate points only, the cooling device being provided with a suitable flexible connection with the motor.

3. The combination with the frame of a motor-vehicle, of a motor extending lengthwise of the frame and supported thereon near one end thereof on or near the sides of the frame, and at the opposite ends thereof at a point substantially midway of the side frames, together with a fuel-tank extending transversely of the frame and supported at three separate points only thereon, said tank having a suitable connection with the motor.

4. The combination with the frame of a motor-vehicle, of a motor comprising a plurality of cylinders, and a suitable base therefor, said base having three separate points of support only on said frame to permit more or less torsional movement of the latter relative to said base; a water cooling device on the frame having three or more separate points of support only whereby more or less torsional movement of the same relative thereto is permitted, and a flexible connection extending from said cooling device to said cylinders; a single exhaust-pipe extending transversely of the cylinders and provided with one or more expanpansion-joints therein, and a fuel-tank supported on the frame of the vehicle at three separate points only, said tank having suitable connection with the motor.

5. The combination with the frame of a motor-vehicle, of a motor-base consisting of separable tubular sections joined together end to end and constituting a closed casing for the crank-shaft and cam-shaft of the motor, the transmission-gearing and the clutch, cylinders for the motor being mounted on one of said base-sections; suitable means to support said base on the frame at three points only by one bolt at each point located respectively one on each side of the base near one end, and the other near the opposite end in the central vertical plane of the base.

6. The combination with the frame of a motor-vehicle, of a motor therefor extending lengthwise of the frame, a tubular base for the motor consisting of endwise-joined sections, on one of which the motor is mounted, said motor-base section and said other sections constituting an inclosing casing for the crank-shaft of the motor, the clutch, and the variable-speed-transmission gear; operating-levers for the clutch and for the transmission-gearing mounted on said base, and means to support the latter on the frame at three points only, said points being located at the angles of an isosceles triangle.

7. In a motor-vehicle, a suitable frame, axles therefor, and a gear on one of said axles whereby it is rotated, a stationary casing inclosing said gear, and a tubular extension on said casing extending centrally and lengthwise of the frame toward the other axle; a motor, a tubular base therefor supported lengthwise of the frame, one end of said base being adjacent to the end of said tubular extension on the driving-axle; a flexible casing having its ends joined respectively to said motor-base and the tubular extension on the rear axle and constituting altogether a substantially continuous casing for the moving parts of the driving mechanism of the vehicle.

8. The combination with a frame of a motor-vehicle, of a longitudinally-extending motor-base suitably supported on the frame, a plurality of motor-cylinders on said base extending therefrom in separated relation one to the other, at right angles to the axis of the base, and a single exhaust-pipe extending transversely of said cylinders, and one or more expansion-joints in said pipe.

9. The combination with the frame of a motor-vehicle, of a suitable motor mounted thereon, a water cooling device, and a fuel-tank supported on the frame in operative relation to the motor, and flexible connections between said cooling device and the motor, and between said fuel-tank and the motor, the latter being non-rigidly secured on the frame.

10. In a motor-vehicle, a motor and a tubular base therefor comprising three separable sections endwise united in substantial axial alinement, one of said sections constituting a support for the motor proper, and the other sections constituting respectively housings for a clutch mechanism and a power-transmission gearing.

11. In a motor-vehicle, a motor and a tubular base therefor comprising three separable sections endwise united in substantial axial alinement, one of said sections constituting a support for the motor proper, and the other sections constituting respectively housings for a clutch mechanism and a power-transmission gearing, together with means to support the motor-supporting section in normal position to permit the removal of parts located in the other sections.

JAMES FRANK DURYEA.

Witnesses:
K. I. CLEMONS,
WM. H. CHAPIN.